United States Patent [19]

Endo et al.

[11] Patent Number: 5,577,140
[45] Date of Patent: Nov. 19, 1996

[54] OPTICAL COUPLING WITH ELECTRIC FIELD ROTATION

[75] Inventors: Tetsuro Endo; Kiichiro Shinokura, both of Tendo, Japan

[73] Assignees: Pioneer Electronic Corporation, Tokyo; Tohoko Pioneer Electronic Corporation, Yamagata-ken, both of Japan

[21] Appl. No.: 391,411

[22] Filed: Feb. 16, 1995

[30] Foreign Application Priority Data

Feb. 22, 1994 [JP] Japan .................................. 6-023891

[51] Int. Cl.$^6$ .................................................. G02B 6/27
[52] U.S. Cl. ................. 385/31; 359/332; 385/11; 385/33
[58] Field of Search .......................... 385/11, 31, 33–35, 385/38, 122; 359/326–332, 485, 487, 488, 501; 372/21, 22; 356/351, 364, 369, 370

[56] References Cited

U.S. PATENT DOCUMENTS

| 4,672,196 | 6/1987 | Canino | 356/369 X |
| 5,130,996 | 7/1992 | Amano et al. | 372/21 |
| 5,400,143 | 3/1995 | Bauer | 356/351 |
| 5,475,491 | 12/1995 | Shiozawa | 356/394 |

*Primary Examiner*—John D. Lee
*Attorney, Agent, or Firm*—Perman & Green

[57] ABSTRACT

An optical coupling device for coupling a semiconductor laser emitting a diverging laser light to a converging optical system converging the laser light onto a rectangle end surface of an optical wavelength converter, comprises: a rotator for rotating the semiconductor laser about an optical axis thereof; a collimator disposed in the optical axis for converting the diverging laser light to a parallel beam along the optical axis; and a polarization rotator for rotating a plane of the electric field vibration of the parallel beam about the an optical axis to guide the beam to the converging optical system, thereby controlling the plane of the electric field vibration direction of the fundamental wave to couple the fundamental wave to a rectangle end surface at a high efficiency.

5 Claims, 4 Drawing Sheets

OPTICAL COUPLING WITH ELECTRIC FIELD ROTATION

BACKGROUND OF THE INVENTION

1. Field of the Invention

The present invention relates to an optical coupling device used for an optical wavelength converter comprising a waveguide of core and a clad surrounding the core for converting a wavelength of a fundamental wave entering the core to a ½ wavelength of a secondary harmonic, and more particularly to an optical coupling device for coupling optically a semiconductor laser to an end surface of the functional three-dimensional waveguide of the wavelength converter.

2. Description of the Related Art

There is an optical wavelength converter system of waveguide-type as shown in FIG. 1. This three-dimensional waveguide type wavelength converter 5 utilizes a semiconductor laser 1 as a light source generating a fundamental wave of a light beam. The optical wavelength converter 5 comprises a core made of a nonlinear optical material and a clad substrate 3 surrounding the core. A converging lens 2 placed between the semiconductor laser and the converter converges the fundamental wave into the rectangle end surface of the core which is an optical coupling portion. The converter 5 converts the wavelength of the fundamental wave to a ½ wavelength of secondary harmonic.

Generally, the thickness and width of the three-dimensional waveguide are different from each other in an active region of the semiconductor laser. The laser light emitted from the end surface of the active region is diverged by the effect of diffraction in which the divergence angle in the wide direction is smaller than that of the thickness direction. Therefore, the emitted laser light becomes a diverging light having divergence angles different each other in the magnetic field direction and the electric field direction which has a transverse section of an elliptic shape and a different power distribution in the longitudinal section. The emitted laser light is linearly polarized as a TE mode which is parallel to the junction plane in the active region of the semiconductor laser.

It is necessary for a high efficiency wavelength conversion in the three-dimensional waveguide to couple a diverging laser light of fundamental wave emitted from the semiconductor laser into the three-dimensional end surface of the optical wavelength converter at a high coupling efficiency. In order to achieve such an efficient optical coupling, the position of a converged light spot of a fundamental wave emitted from the semiconductor laser 1 is accurately coincided to a rectangle end surface of the three-dimensional waveguide in a reference optical axis Z direction by means of a mechanism of three-dimensional relative position alignment in both the XY directions on the rectangle end surface and the reference optical axis Z direction, as shown in FIG. 1.

By the way, there are methods for entering a laser light into the waveguide of the waveguide type wavelength converter which employ a single converging lens above, a collimator lens making a parallel laser light, a pigtail fiber, a Selfoc (registered trade mark) lens, a rod lens and a combination of a halfwave plate placed between two convex lens.

There is a problem in the coupling method using a simple convex lens converging a laser light emitted from the semiconductor laser such that the rectangle shape of the input end surface of the three-dimensional waveguide does not meet with an elliptic shape of the converged laser light spot, resulting in the low coupling efficiency.

For example, even when a diverging laser light having divergent angles of 10° in the electric field direction and 30° in the magnetic field direction emitted from a semiconductor laser is coupled to a rectangle end surface of a symmetrical three-dimensional waveguide with 7 micrometer square section under a pertinent condition to a high coupling efficiency, as shown in a solid line in FIG. 2, the rectangle end surface 3a of the three-dimensional waveguide does not meet with the elliptically converged laser light spot S, resulting in a low coupling efficiency of about 55%. If the elliptic light spot S is expanded as shown in a dotted line in FIG. 2, both the ends of the elliptic light spot is out from the rectangle end surface to waste light energy.

In this case, the far field pattern of the diverging laser light should be deformed to a circle in order to improve the coupling efficiency between the diverged laser light with an ellipse section and the a rectangle end surface of the three-dimensional waveguide. Such a beam shaping method utilizes a collimator lens for making a parallel beam, and a beam shaping prism for increasing or decreasing a short or long axis of an ellipse transverse section of the beam. However, the increase of the prism member and the difficulty of the position alignment for these optical members occur as a problem which is an obstacle to minimize an optical wavelength converter.

On the other hand, when the optical coupling is performed by a coupling method using a pigtail fiber which is not easily manufactured, a plane of polarization of the fundamental wave passing through the pigtail fiber is irregular. This condition is insufficient to improve the performance the functional three-dimensional waveguide of the wavelength converter.

In addition, these conventional coupling methods bring a high cost for production of the optical wavelength converter.

SUMMARY OF THE INVENTION

Therefore, an object of the present invention is to provide an optical coupling device which is capable of coupling a laser light emitted from a semiconductor laser into a functional three-dimensional waveguide such as an optical wavelength converter at a high coupling efficiency by means of a simple optical system.

An optical coupling device according to the present invention optically couples a light source of a semiconductor laser emitting a diverging laser light with divergence angles different from one another in a magnetic field direction and an electric field direction to a converging optical system converging the laser light onto a rectangle end surface of an optical wavelength converter. Said optical coupling device comprising:

rotating means for rotating said semiconductor laser about an optical axis thereof;

a collimator disposed in said optical axis for converting said diverging laser light to a parallel beam along said an optical axis; and polarization rotating means for rotating a plane of the electric field vibration of said parallel beam about said optical axis to guide the beam to said converging optical system.

The optical coupling device of the present invention controls a plane of the electric field vibration direction of the fundamental wave emitted from a semiconductor laser with a different divergent angles in the electric and magnetic field directions so as to couple the fundamental wave to a rectangle end surface of the functional three-dimensional waveguide of the optical wavelength converter. Namely, the long axis of an elliptic converged light spot may be rotated adjacent to the diagonal line of the rectangle end surface of the functional three-dimensional waveguide and then, the polarization direction of the laser light may be adjusted by the polarization rotating means to a pertinent direction for wavelength-converting the fundamental wave in the functional three-dimensional waveguide, so that a high coupling efficiency of the input fundamental wave to three-dimensional waveguide is achieved and the function of the optical waveguide of the wavelength converter is sufficiently improved.

BRIEF DESCRIPTION OF THE DRAWINGS

The features of the present invention are set forth with particularity in the appended claims. The invention together with other objects and advantages thereof may be understood by reference to the following description of the presently preferred embodiments together with the accompanying drawing in which:

DETAILED DESCRIPTION OF THE PREFERRED EMBODIMENTS

Preferred embodiments according to the present invention will be described referring to the accompanying drawings.

Figure 1:
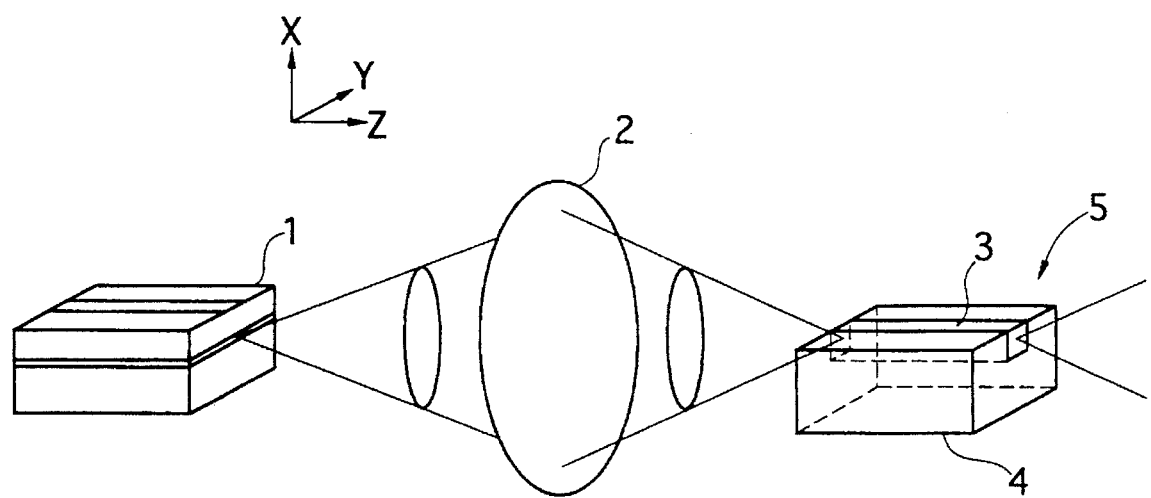
FIG. 1 is a schematic perspective view showing a conventional optical wavelength converter comprising an optical wavelength converter having a three-dimensional waveguide with a rectangle end surface.
Figure 2:
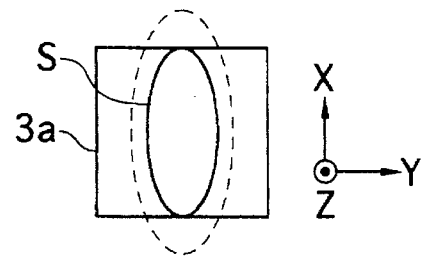
FIG. 2 is a front view showing a rectangle end surface of the three-dimensional waveguide of the optical wavelength converter.
Figure 3:
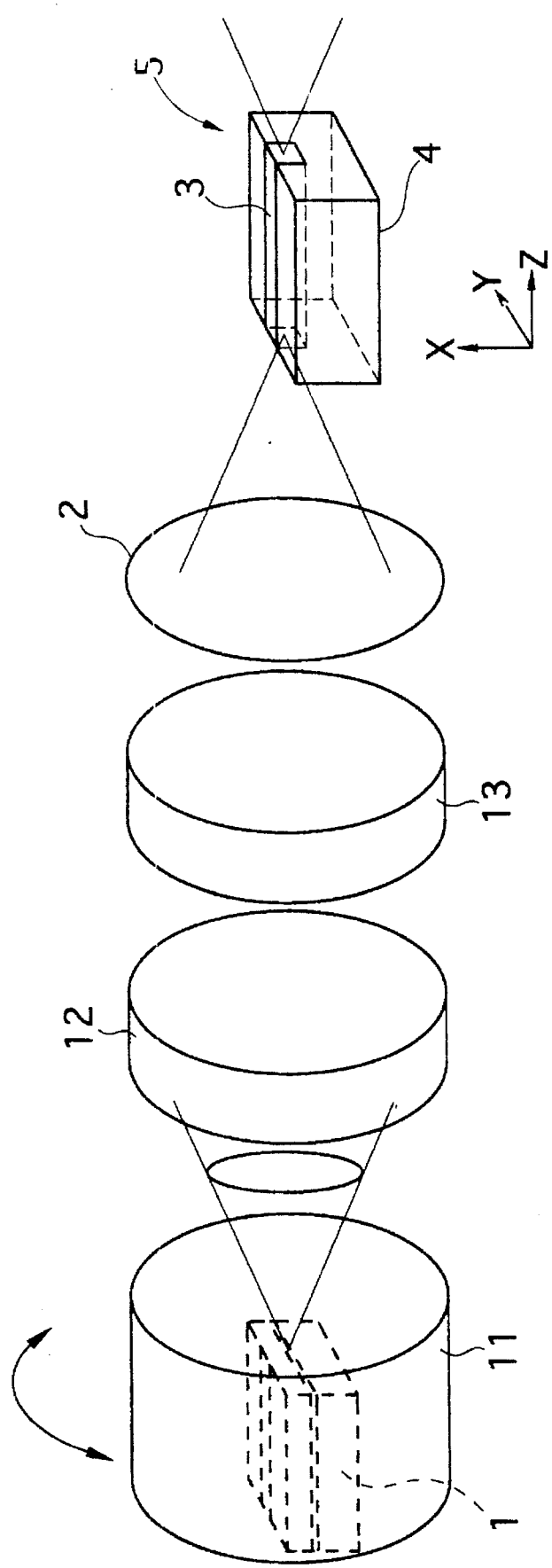
FIG. 3 is a schematic perspective view showing an optical coupling device for a laser light according to the present invention and an optical wavelength converter having a three-dimensional waveguide.

FIG. 3 shows an optical wavelength converter system of waveguide-type including an optical coupling device in one embodiment, in which components of the optical wavelength converter are denoted by the same numbers shown in FIG. 1. A semiconductor laser 1 is mounted in a rotatable member 11 of a rotating mechanism so as to be rotated about the optical axis of a fundamental wave of laser light emitted from the semiconductor laser 1. The rotatable member 11 is driven by a pertinent mechanism. A collimator lens 12 of collimating means and a polarization rotator 13 of polarization rotating means are disposed in turn between the semiconductor laser 1 and an objective lens 2 in the optical axis extending from the light source of the fundamental wave. The collimator lens 12 disposed in the optical axis converts the diverging laser light of the semiconductor laser 1 to a parallel beam along the optical axis.

Figure 4A:
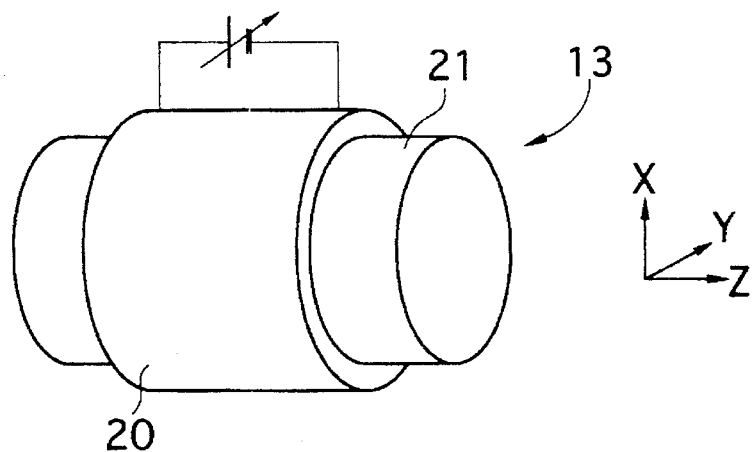
FIGS. 4A and 4B are schematic perspective views each showing a Faraday rotator in the optical coupling device for a laser light according to the present invention.
Figure 4B:
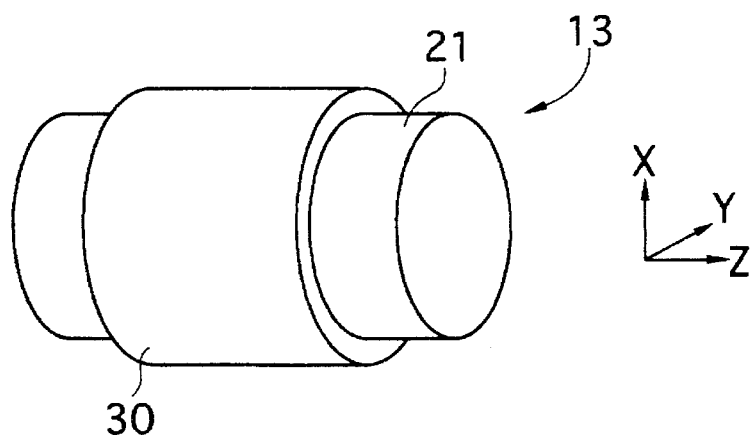

The polarization rotator 13 rotates a plane of the electric field vibration of the parallel beam passing through itself about the optical axis to guide the parallel beam to the objective lens 2 of the converging optical system. The polarization rotator 13 is a Faraday rotator which is constructed as shown in FIG. 4A in that a transparent Faraday medium 21 is disposed in a coil 20 connected to a variable current supply source. Another Faraday rotator of the polarization rotator 13 is formed of a transparent Faraday medium 21 disposed in a sleeve 30 made of ferromagnetic body having a predetermined intensity of magnetic field, as shown in FIG. 4B. Each rotation angle of a plane of the electric field vibration of the parallel beam about the optical axis in these Faraday rotator is adjusted with the changes of properties such as the intensity of the magnetic field applied to the medium, the thickness of Faraday medium in the optical axis direction, and the selection of Faraday medium material pre se.

Figure 5:
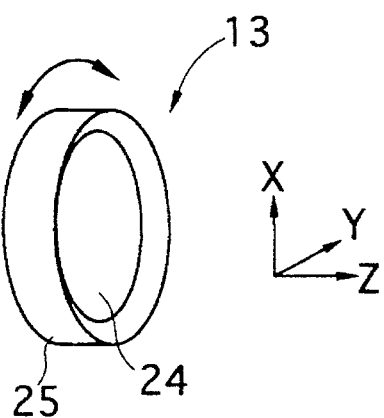
FIG. 5 is a schematic perspective view showing a rotator using a wave plate in the optical coupling device for a laser light according to the present invention.

Instead of these Faraday rotators, the polarization rotator 13 as shown in FIG. 5 may be used. This rotator comprises a wave plate 24 having a normal line coinciding with the optical axis above, and a rotatable member 25 holding the wave plate and being driven rotatably about the optical axis. The rotation angle of the plane of the electric field vibration of the parallel beam about the optical axis is adjusted by rotation of the wave plate 24 about the optical axis.

While the polarization rotator 13 rotates only a plane of the electric field vibration of the parallel beam about the optical axis, the parallel beam is introduced into the converging optical system such as an objective lens 2. The objective lens 2 receives the parallel beam and then converges it onto the end surface of the three-dimensional waveguide of the optical wavelength converter 5.

The optical coupling device is operated as follows:
(Adjustment of an elliptic light spot on a rectangle end surface a waveguide)

First, the output laser beam emitted from the semiconductor laser 1 is collimated by the collimator lens 12 to a parallel beam. When the parallel beam is naturally converged by the converging lens as it is, the converging lens will form an elliptic light spot S on a rectangle e.g., square surface 3a of the three-dimensional waveguide of the optical wavelength converter as shown in dotted ellipse in FIG. 6AA.

Figure 6A:
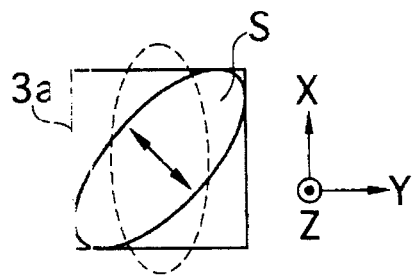
FIGS. 6AA, 6AB, and 6B to 6E are front views each showing a rectangle end surface of the three-dimensional waveguide of the optical wavelength converter for illustrating a various relationship between the rectangle end surface and the converged elliptic light spot formed by the optical coupling device for a laser light according to the present invention.
Figure 6A:
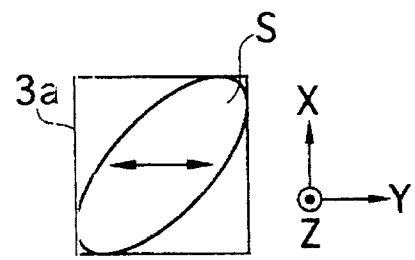
Figure 6B:
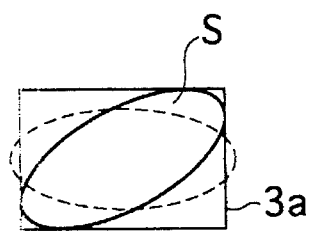
Figure 6C:
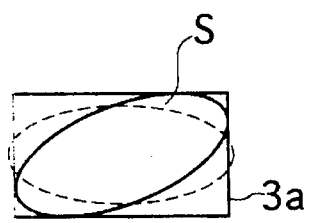
Figure 6D:
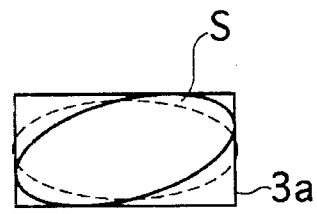
Figure 6E:
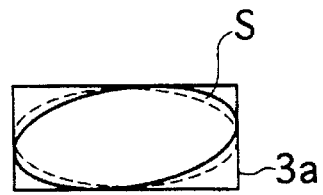

Next, the semiconductor laser 1 is rotated about the optical axis by a predetermined angle so that the elliptic light spot S as shown in solid line in FIG. 6AA is inscribed in the square end surface 3a. The plane of the electric field vibration of the converged laser beam is also rotated about the optical axis as shown by an arrow indicating an expansion of the plane in FIG. 6AA. The rotation angle of the semiconductor laser is therefore set and fixed so that the converged elliptic light spot is inscribed in the rectangle end surface or section of the three-dimensional waveguide. The elliptic light spot is caused by the difference of divergent angles of laser light emitted from the semiconductor laser.

By setting the rotation angle to fix the relative angle between the three-dimensional waveguide and the semiconductor, the optical coupling device achieves a high coupling efficiency because of the accommodation of the elliptic light spot in the rectangle end surface as a whole.

As shown in each solid line of FIGS. 6B to 6E, each semiconductor laser is rotated so that the long axis of the elliptic light spot of the fundamental wave is placed adjacent to the diagonal line of the rectangle end surface three-dimensional waveguide. This rotation of the semiconductor laser brings a high coupling efficiency, even if the waveguide having a various rectangle end surface with various aspect ratios.

(Adjustment of a plane of the electric field vibration of the converged laser beam)

After that, the polarization rotator 13 rotates a plane of the electric field vibration of the input fundamental wave by a predetermined rotation angle so that so as to coincide with a predetermined plane of the electric field vibration of a desirable fundamental wave of guided mode in the three-dimensional waveguide. Namely, as shown by the arrow indicating the expansion of the plane in FIG. 6AB, the plane of the electric field vibration of the converged light beam is rotated anti-clockwise or inverse direction to the rotation of the semiconductor laser. Although the plane of the electric field vibration of the fundamental wave is rotated, the elliptic converged light spot is kept the inscribed position in the rectangle end surface of the three-dimensional waveguide without rotated.

Generally, the three-dimensional waveguide with a rectangle section securely keeps a plane of the electric field vibration of the guided wave and its functions are subject to the plane of the electric field vibration of the input fundamental wave. The rolling of the plane of the electric field vibration of the input fundamental wave of guided mode in the waveguide brings the decrease of the converting efficiency.

The optical coupling device according to the present invention operates to keep the plane of the electric field vibration of the fundamental wave constant at the necessary direction, and then achieves the coupling between the shape of the converged light spot of the fundamental wave and the rectangle end surface of the waveguide at the highest coupling efficiency.

EXAMPLE 1

An optical wavelength converter having a symmetrical three-dimensional waveguide with a square section of 5 micrometer square was formed. A polarization rotator of a 45° Faraday rotator was formed which is a type shown in FIG. 4A. These components, a collimator and a converging lens were set up along the axis of a laser light emitted form a semiconductor laser, as similar to FIG. 6AA, and then the semiconductor laser was rotated by angle 45° from the Y axis of the three-dimensional waveguide.

The semiconductor laser was fixed so that a plane of the electric field vibration direction of its output parallel fundamental wave was right-ward inclined at 45° from the Y axis of the three-dimensional waveguide to inscribe the converged elliptic light spot in the square end surface of the three-dimensional waveguide.

The 45° Faraday rotator rotated only a plane of the electric field vibration direction of the parallel beam was left-ward inclined or rotated at 45° to the Y axis of the three-dimensional waveguide to back the plane of the electric field vibration direction to the Y axis direction. Since the converged elliptic light spot was inscribed in the square end surface of the three-dimensional waveguide and controlled with respect to the plane of the electric field vibration direction thereof, the fundamental wave was coupled to a 5 micrometer square three-dimensional waveguide at a coupling efficiency of 85% as a result.

In this case, the rotation angle of the semiconductor laser and the rotation angle of the plane of the electric field vibration of the laser beam caused by the Faraday rotator for the coupling of the square symmetrical three-dimensional waveguide are determined +45° and −45° respectively. In the other case, the rotation angle of the plane of the electric field vibration of the converged laser beam caused by the Faraday rotator is determined by the absolute value of the rotation angle of the semiconductor with the inverse symbol. When another rotation angle of the semiconductor laser is required, the corresponding polarization rotator causing the rotation angle of the plane of the electric field vibration of the converged laser beam is required.

EXAMPLE 2

An optical wavelength converter having a three-dimensional waveguide with a rectangle section 5×10 micrometer square was formed in which its aspect ratio of the short axis and the long axis was 1:2. A polarization rotator having a halfwave plate was formed. A semiconductor laser emitted a fundamental wave with divergent angles of 30° in the Y direction and 10° in the X direction was used. These components, a collimator and a converging lens were set up along the optical axis of the semiconductor laser, as similar to FIG. 6AA, and then the semiconductor laser was rotated by angle 62° from the Y axis of the three-dimensional waveguide.

The semiconductor laser was fixed so that a plane of the electric field vibration direction of its output parallel fundamental wave was right-ward inclined at 62° from the Y axis of the three-dimensional waveguide to inscribe the converged elliptic light spot in the rectangle end surface of the three-dimensional waveguide.

The polarization rotator of the halfwave plate was previously set by the rotation thereof so that the plane of the electric field vibration direction of the passing the halfwave plate was left-ward inclined or rotated at 62°. The halfwave plate backed the plane of the electric field vibration direction of the fundamental wave to the original Y axis direction. Since the converged elliptic light spot was inscribed in the rectangle end surface and controlled with respect to the plane of the electric field vibration direction thereof, the fundamental wave was coupled to the rectangle three-dimensional waveguide at a coupling efficiency of 82% as a result.

In this case, the rotation angles of the semiconductor laser and the rotator for the coupling of the three-dimensional waveguide are determined +62° and −62° respectively because of its section of the aspect ratio of 1:2. In this way, the rotation angle of the plane of the electric field vibration of the converged laser beam rotator is determined by the absolute value of the rotation angle of the semiconductor with the inverse symbol. When another rotation angle of the semiconductor laser is required, the corresponding rotation angle of the polarization rotator is required.

According to the present invention, the optical coupling device acts to control a plane of the electric field vibration direction of the fundamental wave with elliptic section distribution of intensity to a rectangle end surface of the functional three-dimensional waveguide of the optical wavelength converter.

What is claimed is:

1. An optical coupling device for optically coupling a light source of a semiconductor laser emitting a diverging laser light with divergence angles different from one another in a magnetic field direction and an electric field direction to a converging optical system converging the laser light onto a rectangle end surface of an optical wavelength converter, comprising:

rotating means for rotating said semiconductor laser in a first direction by a predetermined angle about an optical axis thereof;

a collimator disposed on said optical axis for converting said diverging laser light to a parallel beam along said optical axis; and polarization rotating means for rotating a plane of the electric field vibration of said parallel beam in a second direction opposite said first direction by said predetermined angle about said optical axis to guide the beam to said converging optical system.

2. An optical coupling device according to claim 1, wherein said polarization rotating means comprises a Faraday rotator or a halfwave plate.

3. An optical coupling device for optically coupling a light source to a rectangular receiving aperture, the light source emitting a polarized light beam which diverges in different angles from one another in magnetic and electric field directions, said coupling device comprising:

rotating means for rotating said light source in a first direction by a predetermined angle about an optical axis of the light source;

a collimator disposed on said optical axis for converting the diverging light beam to a parallel beam along said optical axis; and polarization rotating means for rotating a plane of the electric field vibration of said parallel beam in a second direction opposite said first direction by said predetermined angle about said optical axis, wherein the rotating of the light source is operative to rotationally offset an elliptic cross section of the parallel beam relative to said rectangular receiving aperture while said rotating of said electric field vibration retains an original orientation of the electric field polarization.

4. An optical coupling device for optically coupling a light source to a rectangular receiving aperture, the light source emitting a polarized light beam which diverges in different angles from one another in magnetic and electric field directions, said coupling device comprising:

rotating means for rotating said light source in a first direction about an optical axis of the light source;

a collimator disposed on said optical axis for converting the diverging light beam to a parallel beam along said optical axis; and polarization rotating means for rotating a plane of the electric field vibration of said parallel beam in a second direction opposite said first direction about said optical axis, wherein the rotating of the light source is operative to rotationally offset an elliptic cross section of the parallel beam relative to said rectangular receiving aperture while said rotating of said electric field vibration is operative to align the electric field with a side of said receiving aperture, thereby providing a more efficient illumination of the receiving aperture.

5. A method of operating an optical coupling device for optically coupling a light source to a rectangular receiving aperture, the light source emitting a polarized light beam which diverges in different angles from one another in magnetic and electric field directions, the method comprising steps of:

rotating the light source in a first direction by a predetermined angle about an optical axis of the light source;

converting the diverging light beam to a parallel beam along said optical axis by means of a collimator disposed on the optical axis; and rotating a plane of the electric field of the parallel beam in a second direction opposite the first direction, said step of rotating the light source rotationally offsetting an elliptic cross section of the parallel beam relative to the rectangular receiving aperture while said step of rotating the plane of the electric field compensates for the rotation of the light source to retain an original orientation of the electric field polarization.

* * * * *